(12) United States Patent
Yurjevich et al.

(10) Patent No.: US 10,696,104 B2
(45) Date of Patent: Jun. 30, 2020

(54) TIRES AND OTHER OBJECTS HAVING AN AERODYNAMIC/HYDRODYNAMIC SURFACE TREATMENT

(71) Applicant: Bridgestone Americas Tire Operations, LLC, Nashville, TN (US)

(72) Inventors: Martin A. Yurjevich, North Canton, OH (US); Craig Balnis, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 306 days.

(21) Appl. No.: 15/103,472

(22) PCT Filed: Dec. 10, 2014

(86) PCT No.: PCT/US2014/069426
§ 371 (c)(1),
(2) Date: Jun. 10, 2016

(87) PCT Pub. No.: WO2015/094829
PCT Pub. Date: Jun. 25, 2015

(65) Prior Publication Data
US 2016/0311268 A1    Oct. 27, 2016

Related U.S. Application Data

(60) Provisional application No. 61/917,385, filed on Dec. 18, 2013.

(51) Int. Cl.
*B60C 13/00* (2006.01)
*B60C 13/02* (2006.01)
(Continued)

(52) U.S. Cl.
CPC .............. *B60C 13/02* (2013.01); *B29D 30/72* (2013.01); *B60C 13/001* (2013.01); *F03D 80/00* (2016.05);
(Continued)

(58) Field of Classification Search
CPC ..... B60C 11/03; B60C 11/13; B60C 11/1307; B60C 2011/0339; B60C 2011/133;
(Continued)

(56) References Cited

U.S. PATENT DOCUMENTS 4,444,713 A    4/1984   Egan et al.
6,806,311 B1   10/2004  Kaltenborn
(Continued)

FOREIGN PATENT DOCUMENTS

CN      1875801      * 12/2006
CN      101758864 A    6/2010
(Continued)

OTHER PUBLICATIONS https://www.backyardchickens.com/articles/my-feather-anatomy-guide.63572/, no date.*
(Continued)

*Primary Examiner* — Justin R Fischer
(74) *Attorney, Agent, or Firm* — Shaun J. Fox; Thomas Y. Kendrick (57) ABSTRACT

Various embodiments of a tire, and other objects, having an aerodynamic and/or hydrodynamic surface treatment are disclosed.

9 Claims, 9 Drawing Sheets (51) Int. Cl.
*B60C 11/03* (2006.01)
*F03D 80/00* (2016.01)
*B29D 30/72* (2006.01)
B62D 35/00 (2006.01)
E04H 1/04 (2006.01)

(52) U.S. Cl.
CPC ........ *B29D 2030/726* (2013.01); *B62D 35/00* (2013.01); *E04H 1/04* (2013.01); *F05B 2230/90* (2013.01); *Y02B 10/30* (2013.01); *Y02B 10/70* (2013.01); *Y02E 10/72* (2013.01); *Y02P 70/523* (2015.11)

(58) Field of Classification Search
CPC ............. B60C 2011/1338; B60C 13/00; B60C 13/001; B60C 13/02
See application file for complete search history.

(56) References Cited

U.S. PATENT DOCUMENTS

| | | | |
|---|---|---|---|
| 7,063,115 B2 * | 6/2006 | Fukutomi | B29C 73/18 152/192 |
| 7,681,627 B2 | 3/2010 | Schmitz et al. | |
| 2001/0032691 A1 | 10/2001 | Ohsawa | |
| 2002/0084553 A1 | 7/2002 | Nun et al. | |
| 2005/0112326 A1 | 5/2005 | Nun et al. | |
| 2006/0162896 A1 | 7/2006 | Schmitz et al. | |
| 2007/0155889 A1 | 7/2007 | Okamoto et al. | |
| 2008/0093887 A1 | 4/2008 | Wood | |
| 2008/0093997 A1 | 4/2008 | Wood | |
| 2011/0069361 A1 | 3/2011 | Jun et al. | |
| 2012/0040041 A1 | 2/2012 | Tsuji et al. | |
| 2012/0043693 A1 | 2/2012 | King et al. | |

FOREIGN PATENT DOCUMENTS

| | | | |
|---|---|---|---|
| CN | 201970800 | * | 9/2011 |
| CN | 103101405 A | | 5/2013 |
| DE | 19630586 | * | 2/1998 |
| EP | 691222 | * | 1/1996 |
| EP | 2011817 A1 | | 1/2009 |
| EP | 2127911 A1 | | 12/2009 |
| GB | 2363100 A | | 12/2001 |
| JP | 02014901 | * | 1/1990 |
| JP | 09165459 A | | 12/1995 |
| JP | 10034668 A | | 7/1996 |
| JP | H109141671 A | | 6/1997 |
| JP | 2002036820 A | | 2/2002 |
| JP | 2003510201 A | | 3/2003 |
| JP | 2006528088 T | | 6/2004 |
| JP | 2007022064 A | | 2/2007 |
| JP | 2008030622 A | | 2/2008 |
| JP | 2010241903 A | | 10/2010 |
| JP | 2010280327 A | | 12/2010 |
| JP | 2007-91155 | * | 4/2012 |
| JP | 2012076723 A | | 4/2012 |
| JP | 2012517909 A | | 8/2012 |
| JP | 2012167207 A | | 9/2012 |
| JP | 2012206669 A | | 10/2012 |
| JP | 2013-006441 A | | 1/2013 |
| KR | 20-1998-0058652 U | | 10/1998 |
| KR | 20030016716 | * | 3/2003 |
| KR | 20-0350383 Y1 | | 5/2004 |
| KR | 10-2005-0040598 A1 | | 5/2005 |
| KR | 2011066418 | * | 6/2011 |
| KR | 2011070277 | * | 6/2011 |
| KR | 20-2011-0007727 U | | 8/2011 |
| WO | 2006052035 A1 | | 5/2006 |
| WO | 2010096072 A1 | | 8/2010 |

OTHER PUBLICATIONS

International Search Report and Written Opinion issued in related PCT App. No. PCT/US2014/069426.
European Pat. No. 2011816; English Abstract, 2018.
Japanese Pat App. No. 2003510201: English Abstract from the related International Pub. No. WO 2003004199, 2003.
Japanese Pat. App. No. 2006528088; English Abstract from the related U.S. Pub. No. 2004256764, 2004.
Japanese Pat. App. No. 2007022064; English Abstract, 2007.
Japanese Pat. App. No. 2010241903; English Abstract, 2010.
Japanese Pat. App. No. 2012517909; English Abstract from related International Pub. No. WO2010096072, 2012.
Japanese Pat. App. No. H09141671; English Abstract, 1997.
Japanese Pat. App. No. H09165459; English Abstract, 1997.
Japanese Pat. App. No. 19980034668; English Abstract, 1998.
Korean Pat. App. No. 1998058652; English Abstract, 1998.
Korean Publication No. 20110007727; English Abstract, 2011.
Korean Publication No. 200340383; English Abstract, 2003.
Sun, Jiurong and Dai, Zhendong, "Non-smooth surface bionics (I)," Progress in Natural Science, vol. 18, No. 3, pp. 241-246. 2008.
Sun, Jiurong and Dai, Zhendong, "Non-smooth surface bionics (II)," Progress in Natural Science, vol. 18, No. 7, pp. 727-733. 2008.
English machine translation of Abstract of JP2010280327. 2010.
English machine translation of Abstract of JP2012076723. 2010.
English machine translation of Abstract of JP2012206669. 2012.
English machine translation of Abstract of JP2002036820. 2002.
English machine translation of Abstract of JP2008030622. 2008.
English machine translation of Abstract of JP2012167207. 2012.
English machine translation of Abstract of JP2013-006441A. 2013.
English machine translation of CN101758864A.

* cited by examiner

TIRES AND OTHER OBJECTS HAVING AN AERODYNAMIC/HYDRODYNAMIC SURFACE TREATMENT

BACKGROUND

Many objects, such as tires, are exposed to air, gases, and liquids that create aerodynamic and hydrodynamic forces, such as drag. Aerodynamic and hydrodynamic drag can lead to inefficiencies in the performance of various vehicles, devices, and the like incorporating tires and other objects. Additionally, aerodynamic and hydrodynamic drag can lead to excessive forces applied to objects subjected to aerodynamic and hydrodynamic forces.

Additionally, some objects, such as molds for rubber and polymer articles, may experience excessive adhesion between the mold surface and the rubber or polymer articles, which results in the mold needing to be cleaned to remove particles adhered to the mold surface.

What is needed is an aerodynamic and hydrodynamic surface treatment for tires and other objects to reduce aerodynamic and hydrodynamic drag. The surface treatment may additionally improve release of rubber and polymer articles from a mold without the necessity of extensive mold cleaning.

SUMMARY

In one embodiment, a tire having a natural surface treatment is provided, the tire comprising: a sidewall; a shoulder; and a tread comprising at least one groove; wherein at least one of the sidewall and the shoulder comprises a natural surface treatment that reduces at least one of an aerodynamic drag and a hydrodynamic drag between a fluid and at least one of the sidewall and the shoulder.

In another embodiment, a tractor-trailer having a natural surface treatment is provided, the tractor-trailer comprising: a surface; and at least one fairing; wherein at least one of the surface and the at least one fairing comprises a natural surface treatment that reduces at least one of an aerodynamic drag and a hydrodynamic drag between a fluid and at least one of the surface and the at least one fairing.

In another embodiment, a wind turbine having a natural surface treatment is provided, the wind turbine comprising: a nose cone; a nacelle; at least one rotor blade; and a tower, wherein at least one of the nose cone, the nacelle, the at least one rotor blade, and the tower comprises a natural surface treatment that reduces at least one of an aerodynamic drag and a hydrodynamic drag between a fluid and at least one of the nose cone, the nacelle, the at least one rotor blade, and the tower.

In another embodiment, a building having a natural surface treatment is provided, the building comprising: at least one side; and at least one roof portion; wherein at least one of the at least one side and the at least one roof portion comprises a natural surface treatment that reduces at least one of an aerodynamic drag and a hydrodynamic drag between a fluid and at least one of the at least one side and the at least one roof portion.

In another embodiment, a mold for molding a tire is provided, the mold comprising: a sidewall portion; a shoulder portion; and a tread portion; wherein at least one of the sidewall portion, the shoulder portion, and the tread portion comprises a negative of a natural surface treatment that at least one of assists in a release of a tire from the mold and assists in self-cleaning of the mold.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Aerodynamic and hydrodynamic drag may be caused by various mechanisms, including for example viscous drag resulting from the viscosity of the fluid that moves relative to the tire of other object. The extent and effects of aerodynamic and hydrodynamic drag may be related to surface geometry and surface texture of the tire or other object, and flow properties of the fluid moving relative to the tire or other object.

Tires on a vehicle traveling down a roadway may encounter aerodynamic drag in the form of air passing the tire as it both rotates and translates. The tires may encounter aerodynamic drag on the tires' sidewalls, shoulders, tread, and any other portion of the tires exposed to the passing air.

Likewise, tires on a vehicle traveling down a roadway may encounter water or other fluids on the roadway, which may expose the tire to hydrodynamic drag. The tires may encounter hydrodynamic drag on the tires' sidewalls, shoulders, tread, and any other portion of the tires exposed to the water or other fluid.

Vehicles traveling on a roadway may encounter both aerodynamic drag (e.g., passing air and/or wind) and hydrodynamic drag (e.g., rain, sleet, or other fluids). The vehicles may encounter aerodynamic and hydrodynamic drags on any part of the vehicle exposed to the air or other fluids. Vehicles may include fairings configured to deflect or block air or water flow which may as such encounter increased aerodynamic or hydrodynamic drag.

Additionally, substantially stationary objects may experience aerodynamic and/or hydrodynamic drag, which causes excessive forces to be applied to those objects. Some examples include building exteriors, especially building roof elements, and some portions of wind turbines.

Certain surface textures may reduce aerodynamic and/or hydrodynamic drag. The surface textures may reduce the aerodynamic and/or hydrodynamic drag by creating a turbulent boundary layer for fluids flowing over the surface.

The turbulent boundary layer may delay flow separation from the surface, which in turn reduces drag on the surface.

In one embodiment, aerodynamic drag and hydrodynamic drag can be viewed as a sort of friction, which causes a fluid to "stick" to a surface in an undesirable manner. The ability of a fluid, or other material, to readily flow or release from a surface may additionally provide benefits to a mold for molding an article, such as a rubber or polymeric article. The mold surface may be modified with a surface texture to help molded articles release more readily, thereby reducing the force necessary to remove those articles from the mold, and reducing the time and effort necessary in cleaning particulate from the molded articles from the mold.

One source of surface textures can be found in nature itself. The concept of biomimicry is the imitation of models, systems, and elements from nature for the purpose of solving human problems. Nature strives to optimize features found in nature, such that they perform a task or function more efficiently than alternative embodiments. For instance, skin/scale surfaces of some aquatic animals have been found to reduce aerodynamic and hydrodynamic drag, including for example viscous drag. Shark skin, for example, has been found to exhibit a surface featuring tiny protrusions, which in turn act to reduce drag of fluids passing over that surface. Additionally, jelly fish have inspired design of surfaces featuring less aerodynamic and/or hydrodynamic drag. Finally, bird feathers are designed, naturally, to exhibit certain aerodynamic properties that assist birds in flight.

Various aspects are thought to contribute to the improved aerodynamic and/or hydrodynamic properties of some of nature's optimized surfaces. For instance, the texture of shark skin may reduce drag via: (1) reduction of viscous drag by providing a textured surface, and (2) increased buoyancy by trapping air within the surface texture.

In another aspect, some surface textures are naturally hydrophobic, and thus shed water and contaminants readily in a self-cleaning action. For example, the sacred lotus includes a surface comprising nanoscale bumps, creating a roughened surface. As water adheres to solids much better than it adheres to air, the roughened surface tends to reduce adhesive force on water droplets, as trapped air in the interstitial spaces of the roughened surface result in reduced liquid-to-solid contact area. The same concept may be found in the wings and bodies of some insects, which are optimized to shed water and other contaminants.

In addition to biomimicry of living creatures, other elements of nature have been found to exhibit improved aerodynamic and hydrodynamic qualities. The shape of a water droplet, for example, has been found to exhibit certain improved aerodynamic properties that can reduce drag.

Accordingly, the application of a natural surface treatment, mimicking elements found in nature, may act to reduce aerodynamic and/or hydrodynamic drag on tires and other objects, such as those described in this application.

Figure 1:
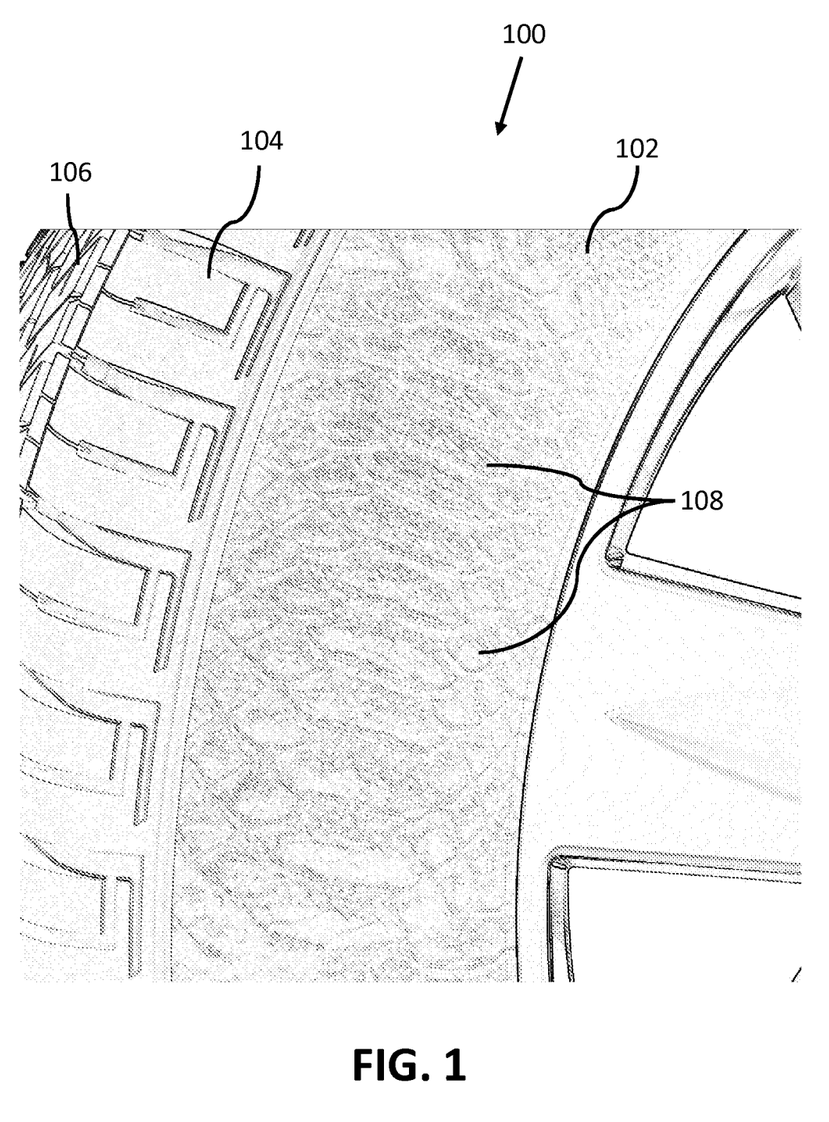
FIG. 1 illustrates an example embodiment of a tire comprising a surface treatment.

FIG. 1 illustrates an example embodiment of a tire 100 comprising a surface treatment. Tire 100 comprises a sidewall 102, a shoulder 104, and a tread 106. Tire 100, and all tires described herein, may comprise any of a variety of tires, including for example a pneumatic tire, a non-pneumatic tire, a passenger tire, a truck tire, a bus tire, a racing tire, an off-the-road tire, and an agricultural tire.

In one embodiment, tire 100 comprises a natural surface treatment 108. In one embodiment, natural surface treatment 108 comprises a scale pattern similar to that which may be found on some reptiles. Natural surface treatment 108 may be applied to sidewall 102, as illustrated. In another embodiment, natural surface treatment 108 may be applied to any of sidewall 102, shoulder 104, tread 106, or any other part of tire 100. In one embodiment, tread 106 comprises grooves (not shown) including a groove base and groove sidewalls, and natural surface treatment 108 may be applied to at least one of a groove base and a groove sidewall.

Natural surface treatment 108, and all natural surface treatments described herein, may act to reduce at least one of aerodynamic drag and hydrodynamic drag on those portions of tire 100, or any other object, upon which natural surface treatment 108 is applied.

Figure 2:
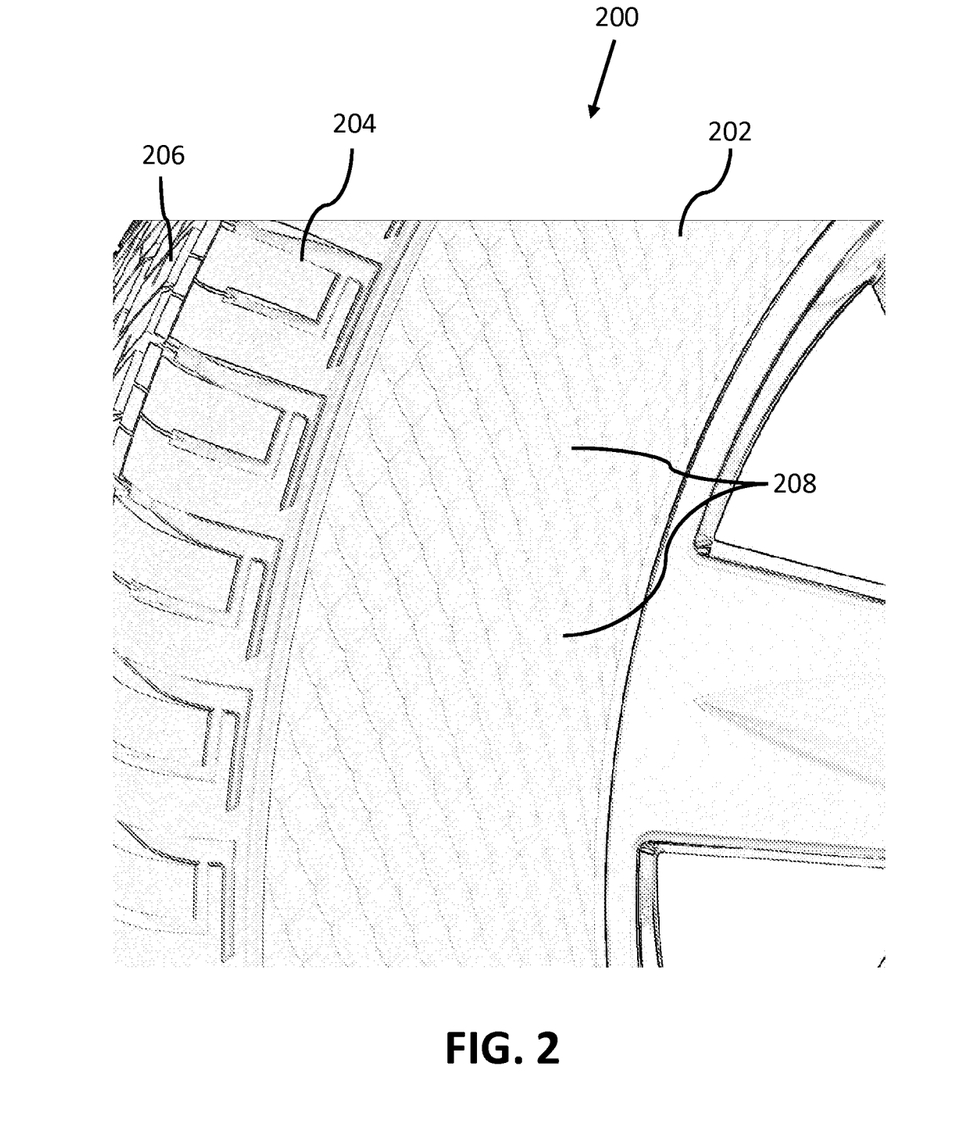
FIG. 2 illustrates an example embodiment of a tire comprising a surface treatment.

FIG. 2 illustrates an example embodiment of a tire 200 comprising a surface treatment. Tire 200 comprises a sidewall 202, a shoulder 204, and a tread 206.

Tire 200 may include a natural surface treatment 208. In one embodiment, natural surface treatment 208 comprises a scale pattern, similar to that which may be found on a reptile or a fish, and more precisely shark skin. Natural surface treatment 208 may be applied to any of sidewall 202, shoulder 204, tread 206, or any other part of tire 200.

Figure 3:
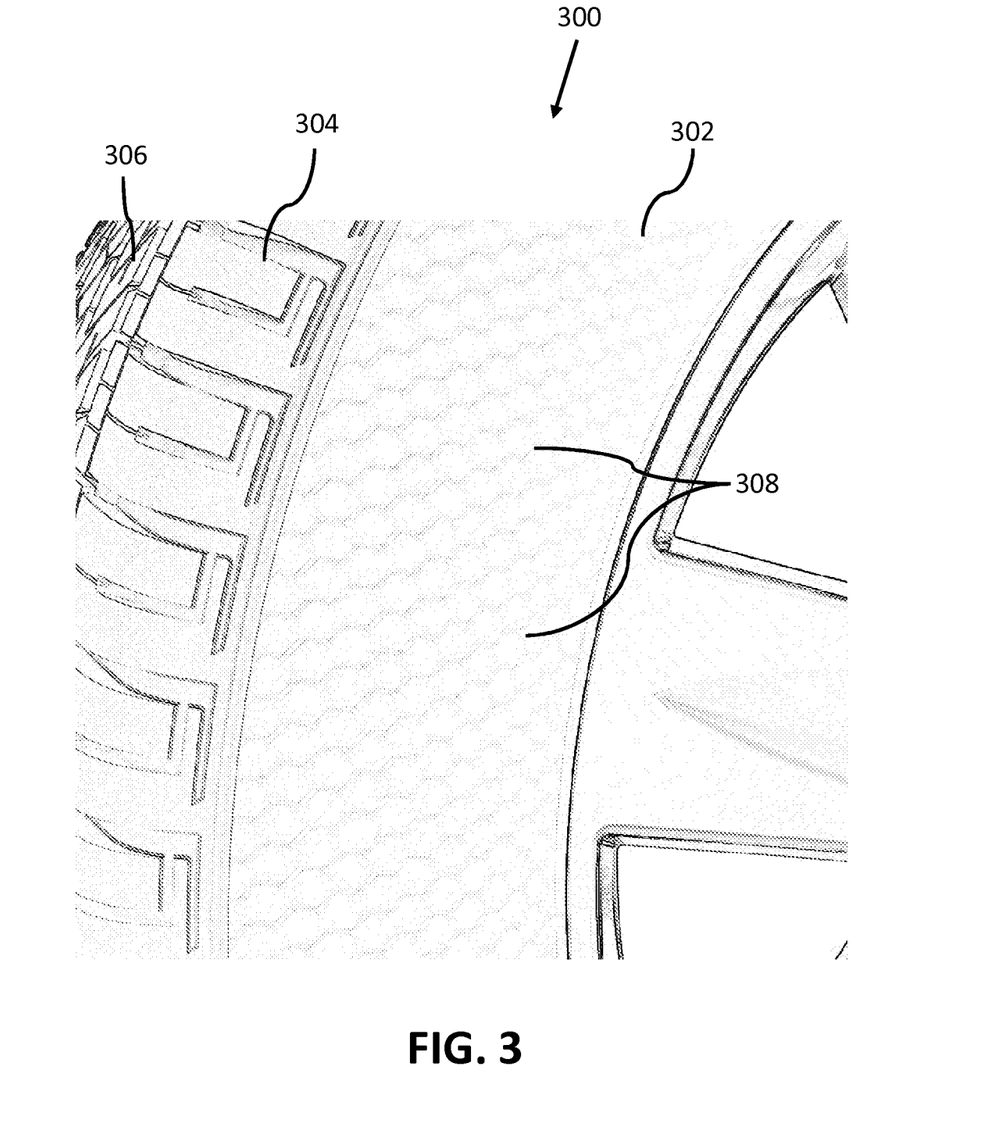
FIG. 3 illustrates an example embodiment of a tire comprising a surface treatment.

FIG. 3 illustrates an example embodiment of a tire 300 comprising a surface treatment. Tire 300 comprises a sidewall 302, a shoulder 304, and a tread 306.

Tire 300 may include a natural surface treatment 308. In one embodiment, natural surface treatment 308 comprises a honeycomb pattern, similar to that which may be found in a beehive. Natural surface treatment 308 may be applied to any of sidewall 302, shoulder 304, tread 306, or any other part of tire 300.

Figure 4:
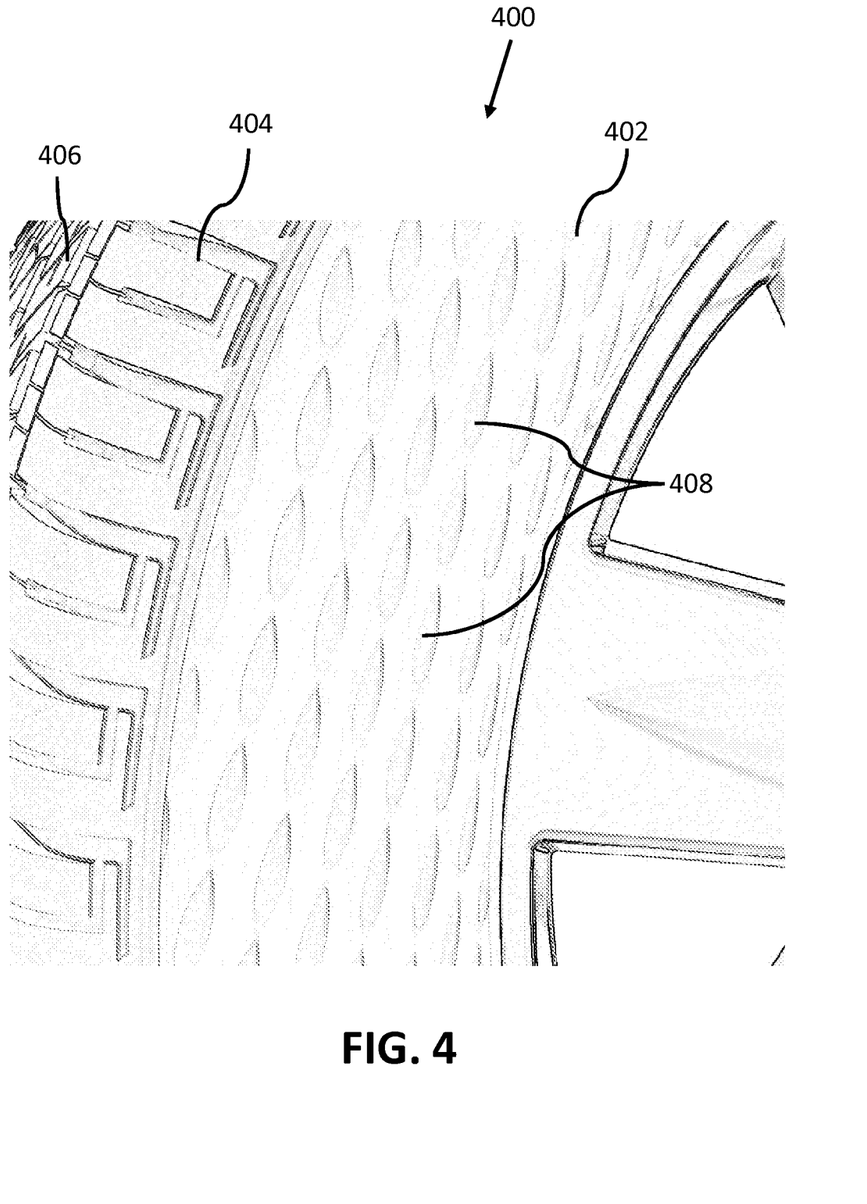
FIG. 4 illustrates an example embodiment of a tire comprising a surface treatment.

FIG. 4 illustrates an example embodiment of a tire 400 comprising a surface treatment. Tire 400 comprises a sidewall 402, a shoulder 404, and a tread 406.

Tire 400 may include a natural surface treatment 408. In one embodiment, natural surface treatment 408 comprises a water drop pattern. Natural surface treatment 408 may be applied to any of sidewall 402, shoulder 404, tread 406, or any other part of tire 400.

Figure 5:
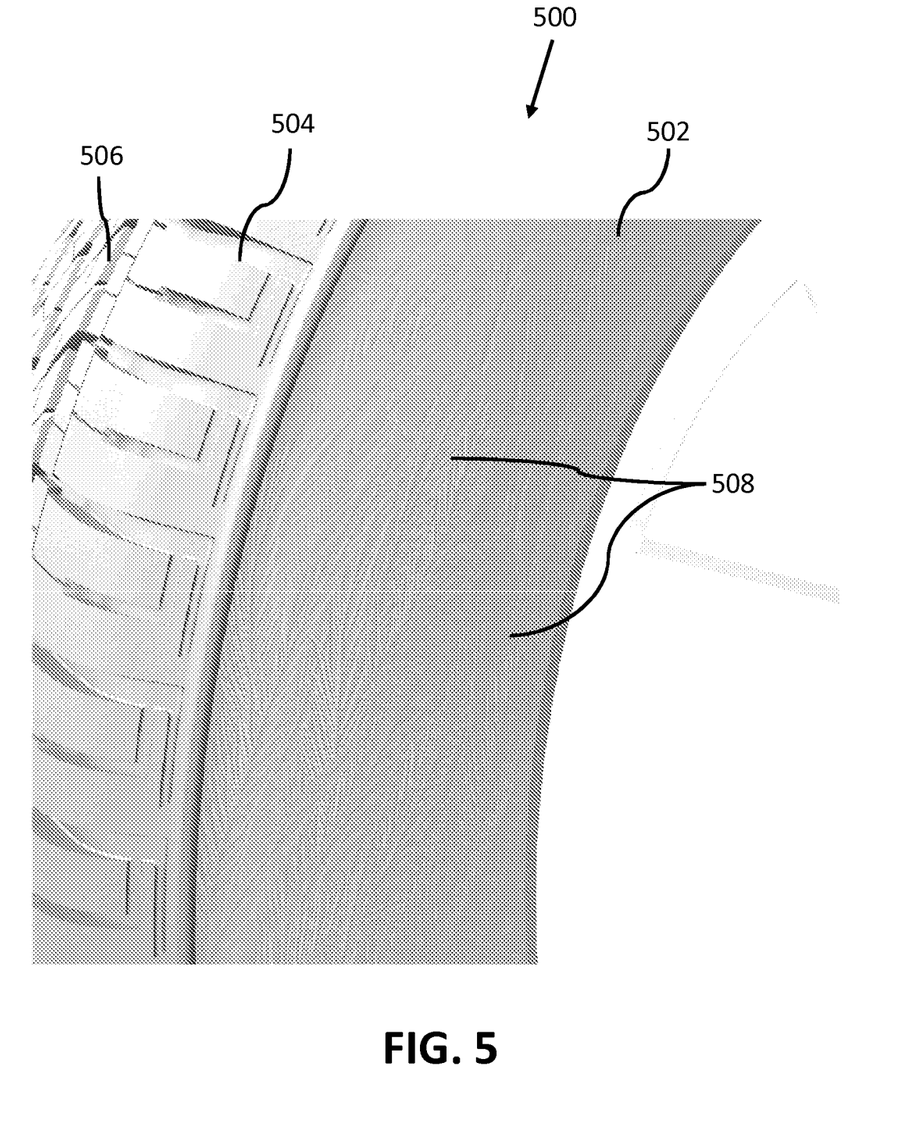
FIG. 5 illustrates an example embodiment of a tire comprising a surface treatment.

FIG. 5 illustrates an example embodiment of a tire 500 comprising a surface treatment. Tire 500 comprises a sidewall 502, a shoulder 504, and a tread 506.

Tire 500 may include a natural surface treatment 508. In one embodiment, natural surface treatment 508 comprises a feather pattern, similar to that which may be found on a bird. Natural surface treatment 508 may be applied to any of sidewall 502, shoulder 504, tread 506, or any other part of tire 500.

FIGS. 1-5 above illustrate various embodiments of natural surface treatment 108, 208, 308, 408, and 508. Natural surface treatment 108, 208, 308, 408, and 508 are not intended to be an exhaustive list. Rather, it is contemplated that a natural surface treatment could comprise any of a variety of biomimicked and nature-influenced surface treatment designs, including other designs specifically discussed above, and additional designs not specifically discussed herein.

In one embodiment, any of tire 100, 200, 300, 400, and 500 are a directional tire, and one or more of natural surface treatment 108, 208, 308, 408, and 508 are configured to have reduced aerodynamic and/or hydrodynamic drag when encountering a fluid in the intended direction of rotation. In another embodiment, any of tire 100, 200, 300, 400, and 500 are a non-directional tire, and one or more of natural surface treatment 108, 208, 308, 408, and 508 are configured to have reduced aerodynamic and/or hydrodynamic drag when encountering a fluid in either direction of rotation.

In one embodiment, one or more of natural surface treatment 108, 208, 308, 408, and 508 protrude from a surface of tire 100, 200, 300, 400, or 500. In another embodiment, one or more of natural surface treatment 108, 208, 308, 408, and 508 extend into a surface of tire 100, 200, 300, 400, or 500. In another embodiment, some aspects of one or more of natural surface treatment 108, 208, 308, 408, and 508 extend into a surface of tire 100, 200, 300, 400, or 500, while other aspects of one or more of natural surface treatment 108, 208, 308, 408, and 508 protrude from a surface of tire 100, 200, 300, 400, or 500.

In one embodiment, an individual feature of natural surface treatment 108, 208, 308, 408, or 508 may include a surface width between about 1.0 mm and about 10.0 mm, measured on a plane substantially tangent to the surface. In another embodiment, an individual feature of natural surface treatment 108, 208, 308, 408, or 508 may include a surface width less than about 1.0 mm and/or greater than about 10.0 mm. In one embodiment, an individual feature of natural surface treatment 108, 208, 308, 408, or 508 may include a surface width great enough to affect the aerodynamic and/or hydrodynamic properties of the surface. In another embodiment, an individual feature of natural surface treatment 108, 208, 308, 408, or 508 may include a surface width small enough to affect the aerodynamic and/or hydrodynamic properties of the surface.

In one embodiment, an individual feature of natural surface treatment 108, 208, 308, 408, or 508 may include a surface depth between about 0.05 mm and about 2.0 mm, measured substantially orthogonally to the surface. In another embodiment, an individual feature of natural surface treatment 108, 208, 308, 408, or 508 may include a surface depth less than about 0.05 mm and/or greater than about 2.0 mm. In one embodiment, an individual feature of natural surface treatment 108, 208, 308, 408, or 508 may include a surface depth great enough to affect the aerodynamic and/or hydrodynamic properties of the surface. In another embodiment, an individual feature of natural surface treatment 108, 208, 308, 408, or 508 may include a surface depth small enough to affect the aerodynamic and/or hydrodynamic properties of the surface.

In one embodiment, one or more of natural surface treatment 108, 208, 308, 408, and 508 are imparted to tire 100, 200, 300, 400, or 500 via a mold. That is, a negative of natural surface treatment 108, 208, 308, 408, or 508 is included in a mold, such that natural surface treatment 108, 208, 308, 408, or 508 is included in tire 100, 200, 300, 400, or 500 during molding. In one embodiment, the negative of natural surface treatment 108, 208, 308, 408, or 508 is imparted to the mold by way of one or more of engraving, three-dimensional printing, and acid etching. In another embodiment, the negative of natural surface treatment 108, 208, 308, 408, or 508 is imparted to the mold through any of a variety of means for adding a feature to a mold.

In one embodiment, one or more of natural surface treatment 108, 208, 308, 408, and 508 assist in release of tire 100, 200, 300, 400, or 500 from a mold. In another embodiment, one or more of natural surface treatment 108, 208, 308, 408, and 508 assist in self-cleaning of a mold.

In one embodiment, a mold (not shown) for molding a tire is provided. The mold may comprise a sidewall portion corresponding to, and a negative of, sidewall 102, 202, 302, 402, or 502. The mold may comprise a shoulder portion corresponding to, and a negative of, shoulder 104, 204, 304, 404, or 504. The mold may additionally comprise a tread portion 106, 206, 306, 406, or 506. At least one of the mold's sidewall portion, shoulder portion, and tread portion may comprise a negative of a natural surface treatment 108, 208, 308, 408, or 508. Negative surface treatment 108, 208, 308, 408, or 508 may at least one of: (1) assist in release of a tire from the mold, and (2) assist in self-cleaning of the mold.

Figure 6:
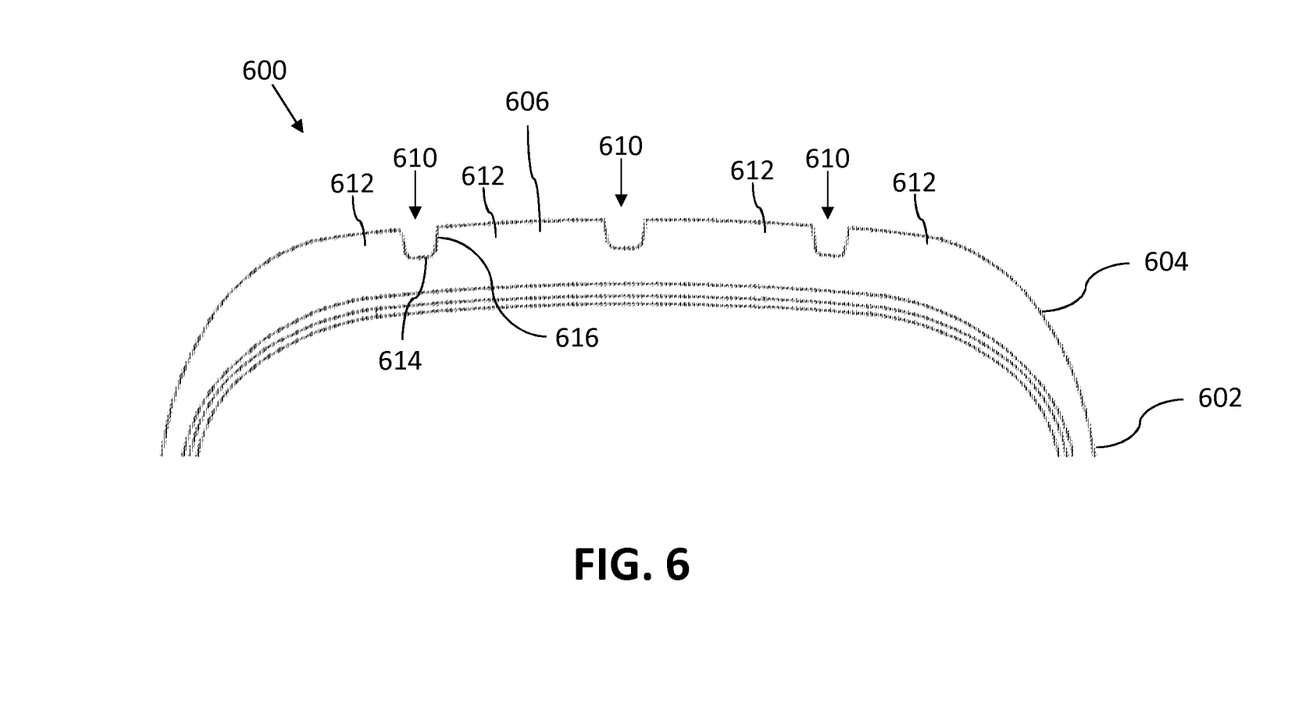
FIG. 6 illustrates a cross-sectional view of an example embodiment of a tire comprising a surface treatment.

FIG. 6 illustrates a cross-sectional view of an example embodiment of a tire 600 comprising a surface treatment. Tire 600 comprises a sidewall 602, a shoulder 604, and a tread 606. In one embodiment, tire 600 comprises at least one groove 610 and at least one rib 612. At least one groove may comprise a groove base 614 and a groove sidewall 616.

In one embodiment, a natural surface treatment (not shown) may be added to at least one of at least one groove 610, including at least one of groove base 614 and groove sidewall 616. In one embodiment, the natural surface treatment may act to reduce aerodynamic and/or hydrodynamic drag caused by a fluid flowing through groove 610. In another embodiment, a natural surface treatment (not shown) may be added to any portion of tire 600 including for example at least one of sidewall 602, shoulder 604, tread 606, groove 610, and rib 612.

A natural surface treatment may be applied to any of a variety of objects that may be exposed to a fluid flow and thus aerodynamic and/or hydrodynamic drag.

Figure 7:
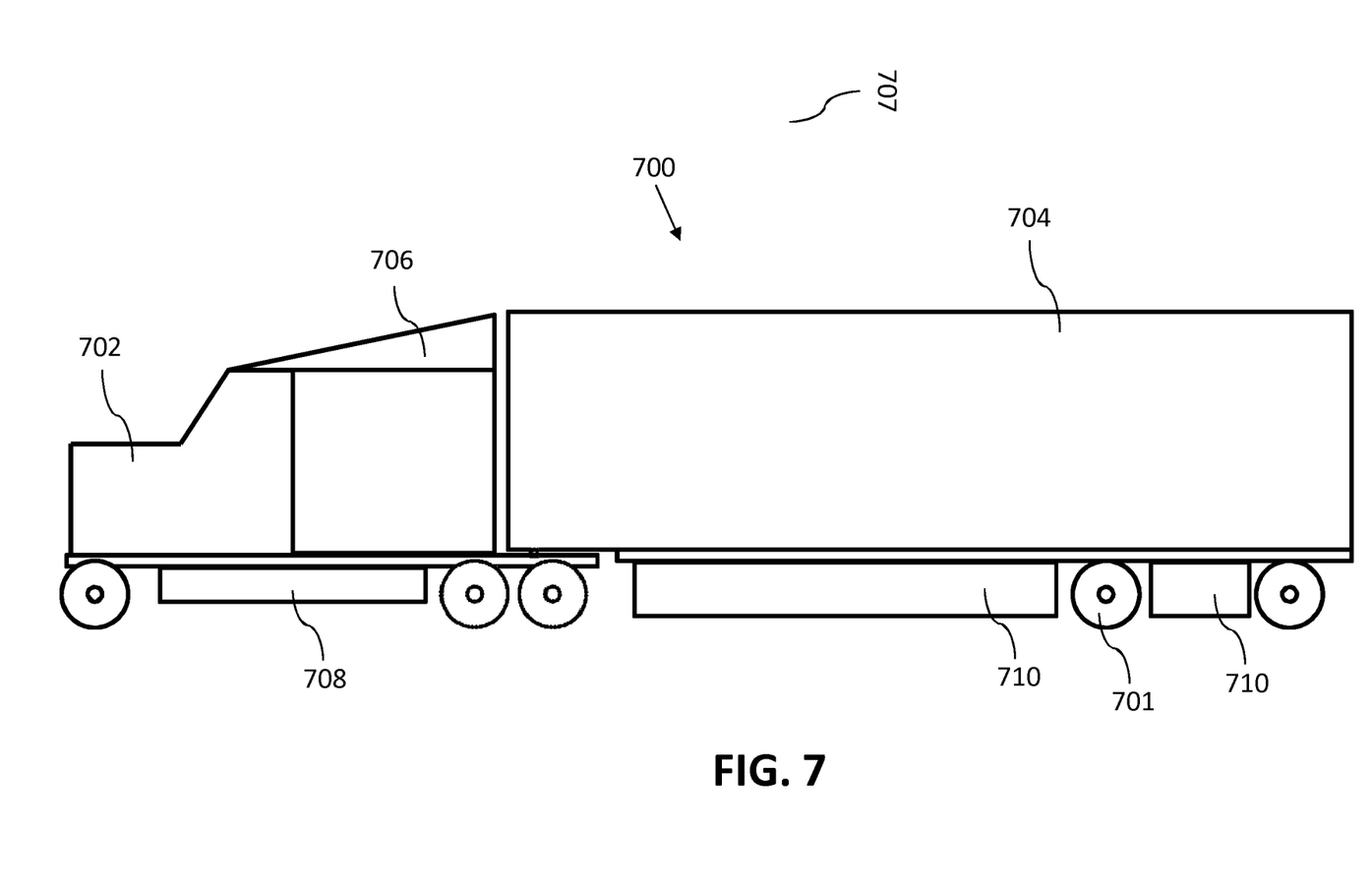
FIG. 7 illustrates an example embodiment of a tractor-trailer comprising a surface treatment.

FIG. 7 illustrates an example embodiment of a tractor-trailer 700 comprising a natural surface treatment. Tractor-trailer 700 may comprise at least one tire 701, a tractor 702, and a trailer (for example, a van) 704.

In one embodiment, tractor-trailer 700 comprises a variety of fairings, which may perform any of a variety of functions, including for example directing air flow, directing fluid flow, mitigating spray of water on a roadway, improving fuel economy, and the like. In one embodiment, tractor-trailer 700 includes any of a cab roof fairing 706, a gap fairing 708, a fuel tank fairing 708, and at least one trailer side skirt 710. Additional fairings (not shown) may include an end cap fairing on the rear of trailer 704. Any of the variety of fairings, and any other surfaces of tractor-trailer 700, are likely to encounter a fluid flow and thus aerodynamic and/or hydrodynamic drag. In one embodiment, a natural surface treatment (not shown) may be applied to any of the variety of fairings, and any other surfaces of tractor-trailer 700, to reduce aerodynamic drag and/or hydrodynamic drag.

In another embodiment, a natural surface treatment may be used to selectively direct a flow of fluids over any of a variety of surfaces of tractor-trailer 700 or fairings described above. For example, a natural surface treatment having reduced hydrodynamic drag may be applied in a specific pattern and/or path to any of a variety of surfaces of tractor-trailer 700 or fairings described above, such that water from rain, sleet, snow, and the like is directed specifically along a preferred pathway. For example, a natural surface treatment may be applied to tractor-trailer 700 in a manner such that water is directed to the ground away from at least one tire 701 to mitigate spray and hydroplaning caused by tire 701 traveling over the water. In another example, a natural surface treatment may be applied to tractor-trailer 700 in a manner such that water is directed to a gutter incorporated in tractor-trailer 700 for the purpose of directing water. In another embodiment, a natural surface treatment may be used to selectively direct a flow of fluids over any of a variety of surfaces of tractor-trailer 700 or fairings described above to shed water from tractor-trailer 700 in an efficient manner.

Figure 8:
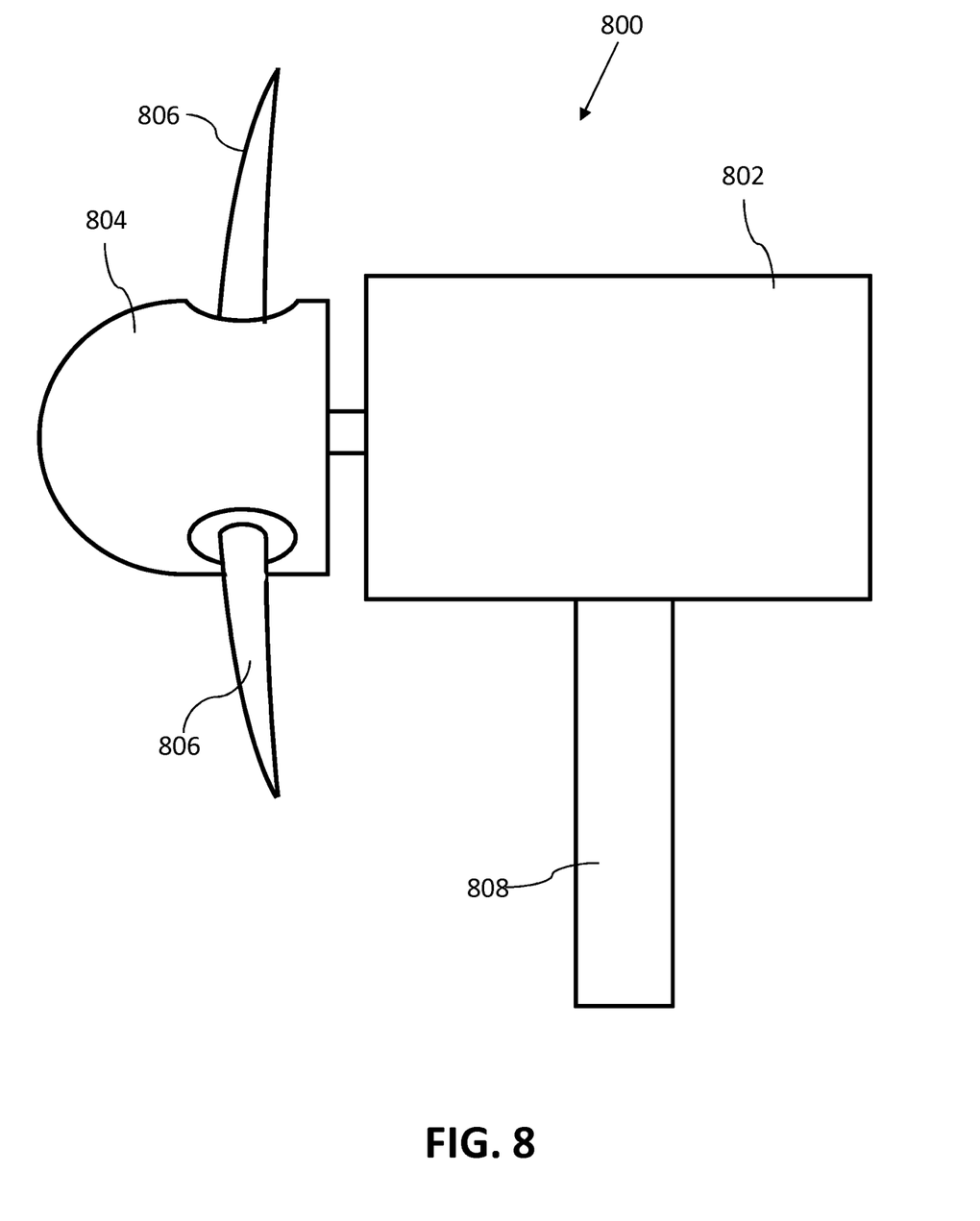
FIG. 8 illustrates an example embodiment of a wind turbine comprising a surface treatment.

FIG. 8 illustrates an example embodiment of a wind turbine 800 comprising a natural surface treatment. Wind turbine 800 may comprise a nacelle 802, a nose cone 804, at least one rotor blade 806, and a tower 808.

Wind turbine 800 may be configured to stand in a flow of a fluid, such as air, and generate electricity or other energy. Nose cone 804 and at least one rotor blade 806 may be configured to rotate relative to nacelle 802 and tower 808. Any of a variety of surfaces of wind turbine 800 may comprise a natural surface treatment configured to perform any of a variety of functions, including for example: direct a flow of air or water; reduce aerodynamic and/or hydrodynamic drag; shed water from rain, sleet, or snow; and/or reduce forces applied by aerodynamic and/or hydrodynamic drag.

A natural surface treatment, including those described above, may be applied to any of a variety of mobile objects wherein it may be desirable to reduce aerodynamic and/or hydrodynamic drag, including for example: a vehicle, a bicycle, an aircraft, a rocket, a missile, a ship, a boat, a submersible craft, and the like. A natural surface treatment, including those described above, may be applied to any of a variety of stationary objects wherein it may be desirable to reduce aerodynamic and/or hydrodynamic drag, including for example: a structure such as a building, bridge, or tower, a roof, and the like. In another embodiment, a natural surface treatment is applied to a rubber air spring and is configured to reduce drag.

Figure 9:
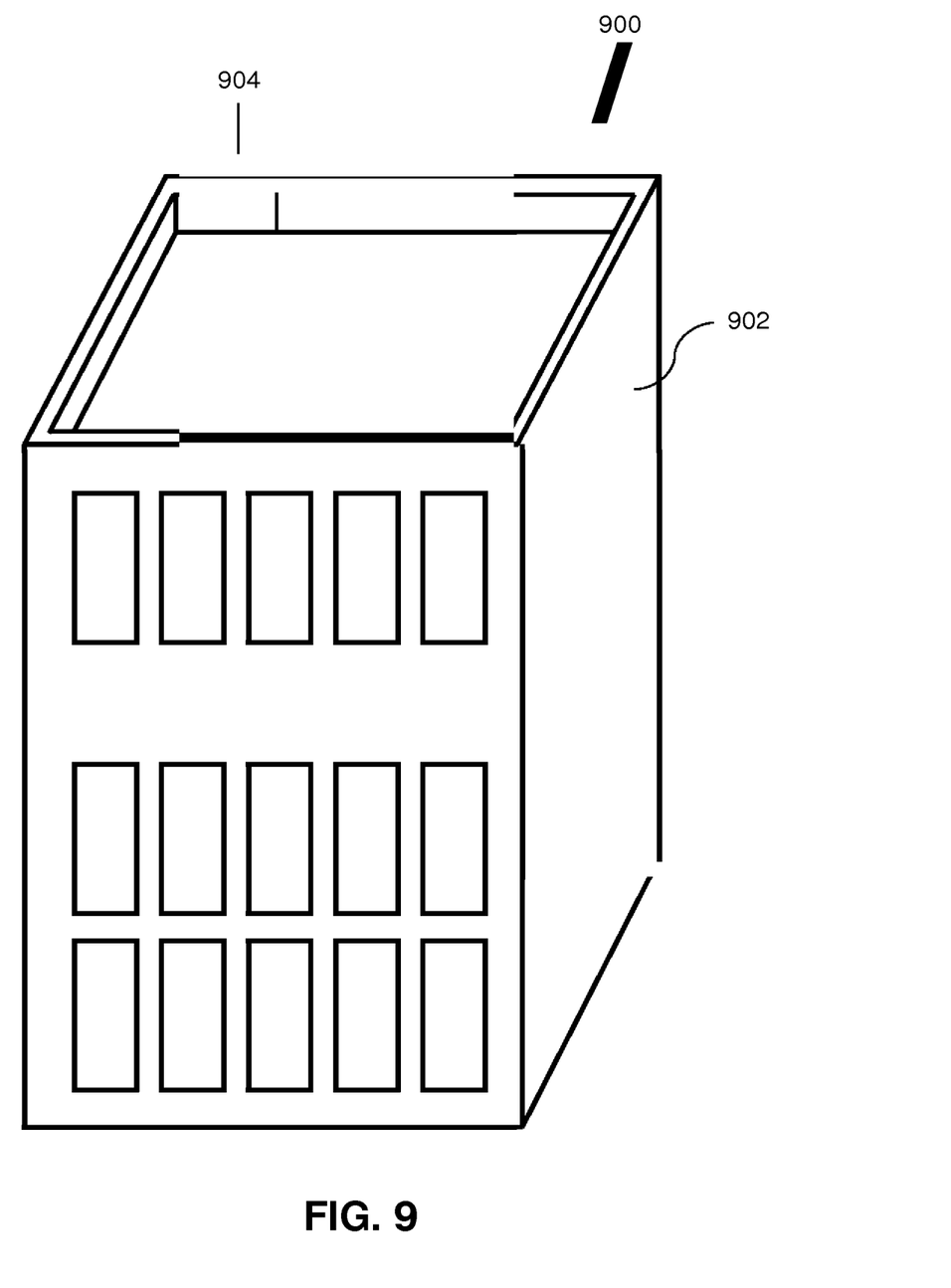
FIG. 9 illustrates an example embodiment of a building comprising a surface treatment.

FIG. 9 illustrates an example embodiment of a building 900 comprising a natural surface treatment. Building 900 may comprise at least one side 902, and at least one roof portion 904.

In one embodiment, a natural surface treatment is applied to roof portion 904. In one embodiment, roof portion 904 is a rubber roofing material. The natural surface treatment may be configured to reduce drag, direct the flow of a fluid such as water, more quickly and efficiently direct a fluid to an evacuation site, and the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire having a natural surface treatment, comprising:
   a sidewall;
   a shoulder; and
   a tread having at least one groove;
   wherein an external surface of at least one of the sidewall and the shoulder comprises a first natural surface treatment that reduces at least one of an aerodynamic drag and a hydrodynamic drag between a fluid and at least one of the sidewall and the shoulder,
   wherein the at least one groove comprises a second natural surface treatment that reduces at least one of an aerodynamic drag and a hydrodynamic drag between a fluid and at least one of the sidewall and the shoulder, and
   wherein each of the first natural surface treatment and the second natural surface treatment comprise at least two of: a reptile scale pattern, a fish scale pattern, a shark skin pattern, a honeycomb pattern, a water drop pattern, and a feather pattern.

2. The tire of claim 1, wherein the at least one groove includes a groove base, and wherein the second natural surface treatment is applied to the groove base.

3. The tire of claim 1, wherein the at least one groove includes a groove base and a groove sidewall, and wherein the second natural surface treatment is applied to the groove base and the groove sidewall.

4. The tire of claim 1, wherein the at least one groove includes a groove sidewall, and wherein the natural surface treatment is applied to the groove sidewall.

5. A tire having a natural surface treatment, comprising:
   a sidewall;
   a shoulder; and
   a tread having at least one groove having a groove base and a groove sidewall;
   wherein at least one of the groove base and the groove sidewall and at least one of the sidewall and the shoulder comprise a natural surface treatment that reduces at least one of an aerodynamic drag and a hydrodynamic drag between a fluid and the at least one groove and at least one of the sidewall and the shoulder, and
   wherein the natural surface treatment in each of the at least one groove and the at least one of the sidewall and the shoulder comprises at least two of: a reptile scale pattern, a fish scale pattern, a honeycomb pattern, a water drop pattern, and a feather pattern.

6. The tire of claim 5, wherein the natural surface treatment is applied to the groove base and the groove sidewall.

7. A tire having a natural surface treatment, comprising:
   a sidewall;
   a shoulder; and
   a tread having at least one groove;
   wherein the at least one groove comprises a natural surface treatment that reduces at least one of an aerodynamic drag and a hydrodynamic drag between a fluid and the at least one groove, and wherein the natural surface treatment comprises at least two of: a reptile scale pattern, a fish scale pattern, a honeycomb pattern, a water drop pattern, and a feather pattern.

8. The tire of claim 7, wherein the at least one groove includes a groove base, and wherein the natural surface treatment is applied to the groove base.

9. The tire of claim 7, wherein the at least one groove includes a groove sidewall, and wherein the natural surface treatment is applied to the groove sidewall.

* * * * *